United States Patent
Günther et al.

(10) Patent No.: US 10,899,618 B2
(45) Date of Patent: Jan. 26, 2021

(54) AQUEOUS SOLUTION CONTAINING ALUMINUM IONS, LACTATE IONS, AND PHOSPHATE IONS, AND A METHOD FOR THEIR PRODUCTION

(71) Applicant: Dr. Paul Lohmann GmbH & Co. KGaA, Emmerthal (DE)

(72) Inventors: Uwe Günther, Hameln (DE); Carsten Schweder, Hameln (DE); Mikulas Furdik, Bratislava (SK); Jozef Harcarik, Bratislava (SK)

(73) Assignee: Dr. Paul Lohmann GmbH KG & Co. KGAA, Emmerthal (DE)

( * ) Notice: Subject to any disclaimer, the term of this patent is extended or adjusted under 35 U.S.C. 154(b) by 133 days.

(21) Appl. No.: 16/186,246

(22) Filed: Nov. 9, 2018

(65) Prior Publication Data

US 2019/0144278 A1     May 16, 2019

(30) Foreign Application Priority Data

Nov. 10, 2017 (DE) .................. 10 2017 126 334

(51) Int. Cl.
    *C01B 25/36*     (2006.01)

(52) U.S. Cl.
    CPC .................. *C01B 25/36* (2013.01)

(58) Field of Classification Search
    CPC .................................................. C01B 25/36
    See application file for complete search history.

(56) References Cited

U.S. PATENT DOCUMENTS

| 2005/0121052 A1 | 6/2005 | Croce |
| 2010/0242997 A1 | 9/2010 | Smith et al. |

FOREIGN PATENT DOCUMENTS

| CN | 105603440 | 5/2016 |
| DE | 10 2004 050703 | 9/2005 |
| JP | 58067644 | 4/1983 |

OTHER PUBLICATIONS

European First Office Action, dated May 14, 2018, in European Patent Application No. 10 2017 126334.9, parent application, 3 pp.
European Extended Search Report, dated Apr. 17, 2019, corresponding to European Application No. 18204334.9, a related application, 3 pp.
Zhang et al. "Sol-Gel Synthesis of $Al_2O_3$—$P_2O_5$ Glasses: Mechanistic Studies by Solution and Solid State NMR," Journal of Materials Chemistry (2004) 11 pp.
Zhang et al. "Aluminum Lactate—An Attractive Precursor for Sol-Gel Synthesis of Alumina-Based Glasses," Journal of Non-Crystalline Solids (2007) 353:1255-1260.

*Primary Examiner* — Andrew J. Oyer
(74) *Attorney, Agent, or Firm* — Leydig, Voit & Mayer, Ltd.

(57) ABSTRACT

The invention relates to an aqueous solution containing aluminum ions, characterized in that the solution contains aluminum ions in a proportion of 0.5-15% (converted, if necessary, to $Al^{3+}$) based on the total mass of the solution, as well as anions of lactic acid (lactate ions) and of phosphoric acid (phosphate ions), and has the theoretical composition $Al^{3+}{}_A(C_3H_5O_3^-)_{x \cdot A} S^{M-}{}_{y \cdot A}(H_2PO_4^-)_{z \cdot A}$ $(OH)^-{}_{(3A-x \cdot A - M \cdot y \cdot A - z \cdot A)}$, wherein S is the anion of an acid with the charge M, x is a value in the range of 0.5-2.8, y is a value in the range of 0-1.5, and z is a value in the range of 0.01-1.5.

20 Claims, No Drawings

AQUEOUS SOLUTION CONTAINING ALUMINUM IONS, LACTATE IONS, AND PHOSPHATE IONS, AND A METHOD FOR THEIR PRODUCTION

CROSS-REFERENCE TO RELATED APPLICATIONS

This application is a U.S. Nonprovisional Application filed under 35 U.S.C. § 111(a) which claims the benefit of Germany Application No. 10 2017 126 334.9, filed Nov. 10, 2017. This application is hereby incorporated by reference in its entirety.

BACKGROUND OF THE INVENTION

The invention relates to a stable aqueous solution containing aluminum ions, lactate ions and phosphate ions. The invention further relates to a method for creating a stable aqueous solution that contains aluminum ions and phosphate ions.

It is known from the prior art that aluminum phosphate is not water-soluble or is water-soluble only in extremely small quantities. Aqueous solutions that contain aluminum and phosphate ions are temporarily stable, at most, and are created, for example, in order to precipitate aluminum phosphate $AlPO_4$ from them. An example of such a merely temporarily stable solution that contains aluminum and phosphate ions is disclosed in DE 2306354.

There is, however, a need in different industrial areas for aqueous solutions that contain both aluminum and phosphate ions in considerable proportional quantities. Areas of application are, for example, use in plastics, adhesives, lacquers, wastewater treatment, or as flocculants. A particularly interesting area in which solutions of this sort are in demand is the manufacture of superabsorbers. The addition of water-insoluble phosphates to superabsorbers is described in WO 02/060983 A2, for example. As WO 2013/076031 A1 demonstrates, for example, phosphoric acid or phosphorous acid as well as substances obtained from them, such as salts, esters and others, are used as chelating agents in monomer mixtures that are used to synthesize superabsorbers. Salts and esters of phosphoric acid or phosphorous acid are used as reducing agents. The aforementioned patent application further describes that the caking of the superabsorber can be prevented or at least reduced by pyrogenic aluminum oxide. It is described as a preferred embodiment that polyvalent cations can be applied to the particle surface to be able to achieve an additional surface crosslinking. Aluminum ions are named as examples of appropriate polyvalent cations.

It would be advantageous if solutions were available that contained aluminum as well as phosphate ions. However, solutions of this type that have a sufficient stability in storage are not yet known from the prior art. Aluminum phosphate generally precipitates out of solutions that contain these two ions in a very short time, so that these solutions can only be used for creation (by precipitation, e.g.) or purification of aluminum phosphate.

SUMMARY OF THE INVENTION

It is, therefore, an object of the present invention to provide a stable aqueous solution that contains aluminum as well as phosphate ions.

Surprisingly, this object could be achieved by an aqueous solution containing aluminum ions that is characterized in that the solution comprises aluminum ions in a proportion of 0.5 15% by weight (converted, if necessary, to $Al^{3+}$) based on the total mass of the solution and further comprising anions of lactic acid (lactate ions) and of phosphoric acid (phosphate ions), wherein the molar proportion of the lactate ions is in the range of 0.01-2.99 times the molar proportion of $Al^{3+}$, and the molar proportion of phosphate ions is in the range of 0.01 2.99 times the molar proportion of $Al^{3+}$.. Proportional quantities for the ions indicated with a charge are thus each based on the ions themselves, so that proportional quantities specified as or converted, for example, into oxides (e.g. $Al_2O_3$) are to be converted into the ions. A stable solution can be obtained via the lactate included in addition to the aluminum ions and phosphate ions. In addition to lactate and phosphate, other anions can also be contained in the solution. The presence of lactate, however, appears to be mandatory for the stabilization of the aluminum- and phosphate-containing solution.

In an embodiment, an aqueous solution may further contain an anion of at least a third acid, wherein the third acid is preferably selected from a group comprising amino acids, carboxylic acids, citric acid, tartaric acid, malic acid, oxalic acid, glycolic acid, succinic acid, gluconic acid, glycine, acetic acid, sulfuric acid, and/or combinations. Charges not balanced by lactate, acid anion (of the third acid) and phosphate may be balanced by $OH^-$ ions, for example.

In an embodiment, a further type of cation or a plurality of further types of cations may be contained in the solution in addition to aluminum. The quantity and the number of a variety of these cations thus exceeds the cations already present as impurities, in particular when technical grade substances are used. Therefore, in the following, any targeted or desired addition of cations is to be considered as an additional cation. Alkali and earth alkali ions have proven to be particularly preferred cations. These are particularly useful because they usually form soluble salts and are therefore easily soluble, on the one hand, and, on the other hand, rarely tend to precipitate out of an Al-containing solution. Alternatively or additionally to these cations, cation additions of the transitional or rare earth metals are also possible. In a particularly preferred embodiment, the added cation is an ammonium ion. Alternatively or additionally to this, $Na^+$, $K^+$, $Ca^{2+}$, $Mg^{2+}$, or $Zr^{4+}$ have been proven as cation additions in Allactate-phosphate solutions. In a preferred embodiment, the aqueous solution is characterized in that it comprises an addition of a cation, wherein the cation is preferably selected from a group comprising alkali ions, alkali earth ions, ammonium ions, cations of one or a plurality of transition or rare earth metals or combinations thereof. In a particularly preferred embodiment, an added cation is selected from a group that contains $Na^+$, $K^+$, $Ca^{2+}$, $Mg^{2+}$, $Zr^{4+}$, $NH_4^+$, or combinations thereof.

In a further embodiment, the solution has clusters of the theoretical compound $Al^{3+}{}_A(C_3H_5O_3{}^-)_{x \cdot A} S^{M-}{}_{y \cdot A}(H_2PO_4{}^-)_{z \cdot A}(OH^-)_{(3A-x \cdot A-M \cdot y \cdot A-z \cdot A)}$, wherein S is the anion of an optionally available third acid having the charge M, x is a value in the range of 0.01-2.99, preferably 0.5-2.8, more preferably 0.75-2.0, most preferably 1.0-1.5, y is a value in the range of 0 2.8, preferably 0 2, preferably 0-1.25, particularly preferably 0-1.0 and z is a value in the range of 0.05 2.9, preferably, 0.1-2.5, more preferably 0.2-1.5, particularly preferably 0.3-1.25. The sum of x, M•y, and z is preferably ≤3, so that, according to the above formula, the positive charge of the aluminum ions is balanced. However, other cations (described in detail below) are also conceivable in the solution, so that the sum of x, M•y, and z is even greater than 3 can be. Because lactate and phosphate are necessarily present in order to achieve a stable aluminum- and phosphate-containing solution, x and z are always >0.

Lactate ions are thus preferably, but not mandatorily, the most common anionic components (in terms of the molar proportion of the dissolved materials) in the solution. As is apparent from the above formula, x in the clusters can assume a value in the range of 0.5-2.8 so that, given a factor of 2.8, a majority of the charge introduced into the solution by the aluminum ions is already compensated. The proportion of phosphate ions is therefore correspondingly small in this case. Additional charges introduced by aluminum cations may be compensated by the additional acid S or by the optionally present $OH^-$ ions.

In an embodiment of the present invention, Y>0. Thus, according to the aforementioned formula, at least one anion of a third acid is included. This acid or this anion is preferably selected from a group comprising amino acids, carboxylic acids, citrate, tartrate, malate, oxalate, glycolate, succinate, gluconate, glycinate, acetate, sulfate and/or combinations thereof. Experiments have shown that the stability of the aqueous solution can be further increased using these anions. In addition, in some cases, an increase of the concentration of aluminum ions and/or phosphate ions is possible.

In an embodiment, the aqueous solution is characterized in that it is stable in a temperature range of 0-80° C. Particularly preferred are aqueous solutions that are also stable in storage at low temperatures. Solutions are preferred that are stable in storage at <30° C., preferably <20° C., particularly preferably <10° C. In the context of this invention, stable in storage is to be understood as periods that preferably exceed 1 month, preferably 6 months, particularly preferably 12 months. An aqueous solution is thus stable in storage for longer than 1 month, preferably longer than 6 months, particularly preferably longer than 12 months. This stability in storage allows for these solutions to be maintained and/or transported until their use. Even transportation over long distances, e.g. by truck or else by ship, is possible with such storage stability.

In order to keep the phosphate content of the solution as high as possible, it is preferred that as high a proportion of the anions as possible be phosphate ions. According to the above formula, x is thus preferably comparatively small. In a preferred embodiment of the invention, x is in a range of 0.5-2.5, preferably in the range of 0.75-2.0, particularly preferably in the range between 1.0 and 1.5. In the range of x=1.0 to x=1.5, one third to one half of the positive charges introduced into the solution by the triple positively charged aluminum cations are compensated by lactate. The remaining negative charge necessary for compensation of the positive charge can be provided by anions S of the acid, phosphates or $OH^-$ ions. The stability of the solution is thus reduced at a value of x<0.5. It appears that, in the case of small lactate portions, the stabilization of the solution is not sufficient and a precipitation of aluminum phosphate may therefore occur as a result of the storage conditions.

The amount of anions of the additional third acid (S) should also be as small as possible, so that the phosphate content can be kept as large as possible. In a preferred embodiment, Y is therefore smaller than 1.25, preferably smaller than 1.0, particularly preferably smaller than 0.8.

In an embodiment, the third acid has an additional function. Such a function is preferably selected from a group comprising substituents that introduce an amino function, an additional acid function, a carbonyl function, a double bond, a triple bond, a hetero atom, a charge, a partial charge and/or combinations thereof into the molecule. In particular if the function of the third acid is suitable to positively change the properties of the desired solution, the proportion of the third acid may be very high and even exceed, for example, the proportion of the phosphoric acid and/or lactic acid. In particular if the adjustment of a specific pH value is desired, this may be realized in some preferred embodiments by the selection of an appropriate third acid that introduces corresponding functions. In this way, for instance, a buffer function could be realized through an amino function and/or an (additional) acid function, for example. It would thus be possible to keep the pH value at least largely constant even in the case of changes to environmental conditions (such as temperature fluctuations, contamination, dilution (by rain water, for instance)) and to prevent the precipitation of salts and/or other solids.

It has been shown that it is particularly advantageous for storage stability when X>Z. In a preferred embodiment, the proportion of lactate ions in the solution is thus greater than that of the phosphate ions. As shown below, however, this is not absolutely necessary.

In order to ensure the long-term stability of the solution, it is preferred that the concentration of the aluminum ions be in the range of 1-10% by weight (converted, if necessary, to $Al^{3+}$) based on the total mass of the solution. The concentration of the aluminum ions (converted, if necessary, to $Al^{3+}$) is even more preferably in the range of 1.5-5% by weight.

In a further embodiment, the aqueous solution is characterized in that, in the theoretical compound $Al^{3+}{}_A(C_3H_5O_3^-)_{x\bullet A}S^{M-}{}_{y\bullet A}(H_2PO_4^-)_{z\bullet A}(OH)^-{}_{(3A-x\bullet A-M\bullet y\bullet A-z\bullet A)}$, of the solutes, the index $(3A-x\bullet A-M\bullet y\bullet A-z\bullet A)$ is >0. Thus, $OH^-$ ions are preferably present. It is particularly preferred that the index $(3A-x\bullet A-M\bullet y\bullet A-z\bullet A)$ is in the range of 0.5 to approximately 1.75 (see examples below. The sum of x, M•y, and z is thus preferably in the range of 1.25 to 2.5.

Additional stabilizers (such as chelating agents, polymers) can be added to the solution. Further conceivable is the addition of a substance or a plurality of substances that is/are selected independently of each other from a group comprising acetylacetone (acac), ethylenediamine (en), 2-(2-aminoethylamino)ethanol (AEEA), diethylene triamine (dien), iminodiacetate (ida), triethylene tetramine (triene, TETA), triaminotriethylamine (tren), nitrilotriacetate (nta), bis(salicylidene)ethylenediamine (salen), ethylenediaminotriacetate (ted), ethylenediamine tetraacetate (EDTA), diethylenetriamine pentaacetate (DTPA), 1,4,7,10-tetraazacyclododecane-1,4,7,10-tetraacetate (DOTA), dimethylglyoxime (dmg), 8-hydroxychinoline (oxin), 2,2'-bipyridine (bpy), 1,10-phenanthroline (phen), dimercaptosuccinic acid (DMSA), 1,2-bis(diphenylphosphino)ethane (dppe), or others. Particularly preferred are chelating agents in which at least one energetic positive interaction between the chelating agent and the cation that is to be complexed is formed via a hetero-atom that is selected from a group comprising N, P, and S, or from a functional group comprising an oxygen atom and is selected from a group comprising ketones (A(C=O)B with A, B=organic radical), aldehyde (A=H, B=organic radical or H), ester (A=O—R, B=organic radical or H), amide (A=$NH_2$, NHR, $NR_1R_2$, B=organic radical or H), urea (A, B=$NH_2$, NHR, $NR_1R_2$), urethane (A=OR, B=$NH_2$, NHR, $NR_1R_2$), [and] alcohols (A-OH, A=organic radical). It is preferred, however, that the solution contains no additional stabilizers. In particular, it is preferred that the solution comprises none of the aforementioned stabilizers, and in particular none of the aforementioned chelating agents.

Another subject of the invention is a method for creating an aqueous solution, wherein the solution comprises aluminum ions in a proportion of 0.5-15% by weight (converted, if necessary, to $Al^{3+}$) based on the total mass of the solution, as well as anions of lactic acid (lactate ions) and of phosphoric acid (phosphate ions), wherein the molar proportion of the lactate ions is in the range of 0.01-2.99 times the molar proportion of $Al^{3+}$, and the molar proportion of phosphate ions is in the range of 0.01-2.99 times the molar proportion of $Al^{3+}$ wherein the method is distinguished by the steps a) providing of water in a reaction vessel;
b) addition into the reaction vessel of a basic aluminum salt, preferably selected from a group containing Al carbonate, Al hydroxide, Al oxide, an aluminate, or combinations thereof, while stirring;
c) addition of lactic acid and/or a lactate and, parallel to this or offset in time from it, of phosphoric acid and/or of a phosphate;
d) stirring the resulting mixture, wherein the sequence for performing the steps b) and c) is discretionary.

It has been shown that a stable solution can be obtained using the aforementioned series of the individual process steps. This method allows for the production of large amounts of a desired solution, preferably as described above. For example, more than 1 m³ of the aforementioned solution may be produced in one batch.

If the presence of an additional anionic component is intended, this is preferably admixed in the form of an acid or of a readily soluble salt. More preferably, the addition takes place together with the remaining substances named in step c) or during or after step d).

In a variant of the method, it is provided that clusters of the theoretical compound $Al^{3+}{}_A(C_3H_5O_3)^-{}_{x \cdot A} S^{M-}{}_{y \cdot A}(H_2PO_4)^-{}_{z \cdot A}(OH)^-{}_{(3A-x \cdot A-M \cdot y \cdot A-z \cdot A)}$ are created, wherein S is the anion of the optionally present third acid with the charge M, x is a value in the range of 0.01-2.99, preferably 0.5-2.8, more preferably 0.75-2.0, most preferably 1.0-1.5, y is a value in the range of 0 2.8, preferably 0 2, preferably 0-1.25, particularly preferably 0-1.0, and z is a value in the range of 0.05-2.9, preferably 0.1-2.5, more preferably 0.2-1.5, particularly preferably 0.3-1.25.

With respect to the method, it is particularly preferred that step c) be performed at a temperature >25° C., preferably >40° C., more preferably >50° C., particularly preferably at 60-70° C., or alternatively under reflux. At these temperatures, the mixture or solution is supplied with sufficient energy to substantially prevent a precipitation of aluminum phosphate. It is believed that at these temperatures, sufficient thermal energy is available, so the ion clusters can form. These clusters are soluble and/or remain colloidal in solution and do not precipitate when temperatures subsequently fall below the aforementioned temperature.

In some compounds and/or variants of the method, it cannot be entirely ruled out that a small portion of the aluminum and/or phosphate used precipitates as aluminum phosphate, for example, or in combination with other substances. Impurities of the starting materials may also be included as insoluble components in the solution or mixture. In this case, a filtration is advantageous. In a preferred method variation, the method is characterized in that a filtration follows after step c). This is preferably performed through filtration in a filter press. As the product of this filtration step, a clear solution is obtained that fulfills the requirements with respect to the desired stability and the content of aluminum and phosphate ions.

DETAILED DESCRIPTION OF THE INVENTION

Examples for the aforementioned solution and a method for their production are exemplarily given in the following:

Example 1

Theoretical Composition of the Dissolved Substances: $Al^{3+}(C_3H_5O_3)^-{}_{1.5}(H_2PO_4)^-(OH)^-{}_{0.5}$ For producing such a solution, aluminum is prepared in the form of a basic salt (carbonate, hydroxide, oxide, aluminate, preferably hydroxide) in an aqueous suspension with 10%-20% solids by weight (wt.-%). A suitable ingredient are, for example, the amorphous substances known as "aluminum oxide hydrates", created in a known manner through precipitation from an aluminum salt solution through the addition of bases. Although the use of crystalline aluminum hydroxides such as bayerite (alpha-$Al(OH)_3$), hydrargillite (gamma$Al(OH)_3$), boehmite (alpha-$AlO(OH)$) or diaspore (gamma-$AlO(OH)$) is not excluded, it is less preferred because these aluminum salts typically dissolve more slowly in acids than amorphous aluminum hydroxide or oxide hydrate. The most reactive is naturally freshly precipitated aluminum hydroxide or oxide hydrate, but commercially available aluminum hydroxides or oxide hydrates are very suitable as well. An example of a suitable raw material is aluminum oxide, hydrated (powder, according to the *European Pharmacopoeia*, 9$^{th}$ ed., 47.0%-60.0% $Al_2O_3$, Dr. Paul Lohmann GmbH KG, article number 511066100). Then, lactate and phosphoric acid are admixed to it while stirring and brought to reaction at a temperature of slightly over 40° C. This produces a clear to slightly opaque solution that is freed of possibly present (undissolved or precipitated) solid components via filtration. The filtration takes place here at a maximum of 80° C. Further tests have shown that filtration at low temperatures can be advantageous. The solution obtained in this manner is stable in storage at room temperature. The solution is storage stable even above room temperature. A reversible viscous gel forms only above 60° C. Such a solution is suitable, for example, for use in plastics, adhesives, lacquers, wastewater treatment, or flocculating agents.

Example 2

Theoretical Composition of the Dissolved Substances: $Al^{3+}(C_3H_5O_3)^-{}_{1.2}(H_2PO_4)^-{}_{0.8}(OH)^-$ For producing a solution having the aforementioned composition of the solute, 1220 kg of ultra-pure water, 196 kg lactic acid, 147 kg phosphoric acid, and 1.59 kmol $Al^{3+}$ in the form of a basic salt were used. The water was first provided in a solution tank. Lactic acid and phosphoric acid are slowly admixed to the receiver while stirring. Unlike in the aforementioned Example 1, the aluminum compound is only admixed into the provided solution afterwards. It is then heated to 60-65° C. In order to ensure the long-term stability of the solution, the mixture obtained is kept at 60-65° C. for 20±2 hours under reflux cooling. After completion of the resulting reaction, the mixture/solution is filtered clear via a filter press and bottled.

The following list shows examples of compounds for which stable solutions can be achieved.

Compounds that are included here not only contain additional acid residues, but also some that comprise additional anions of this type. This list is only exemplary, and there are additional examples of stable aqueous solutions according to the invention.

Compounds without Additional Anions (S):

$Al_4(C_3H_5O_3)_6(H_2PO_4)_3OH)_3$
$Al_5(C_3H_5O_3)_6(H_2PO_4)_3(OH)_6$
$Al_6(C_3H_5O_3)_6(H_2PO_4)_4(OH)_8$

Compounds with Additional Anions (S):

S=sulfate:
$Al_4(C_3H_5O_3)_3(SO_4)_3(H_2PO_4)(OH)_2$
$Al_6(C_3H_5O_3)_3(SO_4)_6H_2PO_4)(OH)_2$ S=oxalate
$Al_{5.4}(C_3H_5O_3)_5(C_2O_4)_{0.52}(H_2PO_4)_3(OH)_{7.16}$
$Al_{5.4}(C_3H_5O_3)_5(C_2O_4)_{0.52}(H_2PO_4)_3(OH)_{7.16}$ S=citrate
$Al_{5.7}(C_3H_5O_3)_5(C_6H_5O_7)_{0.33}(H_2PO_4)_3(OH)_{8.11}$
$Al_{5.7}(C_3H_5O_3)_5(C_6H_5O_7)_{0.66}(H_2PO_4)_3(OH)_{7.12}$ S=succinate
$Al_{4.4}(C_3H_5O_3)_5(C_4H_4O_4)_{0.52}(H_2PO_4)_3(OH)_{4.16}$
$Al_{4.4}(C_3H_5O_3)_5(C_4H_4O_4)(H_2PO_4)_3(OH)_{3.2}$ S=malate
$Al_{5.7}(C_3H_5O_3)_5(C_4H_4O_5)_{0.52}(H_2PO_4)_3(OH)_{8.06}$
$AL_6(C_3H_5O_3)_3(C_4H_4O_5)_3(H_2PO_4)_3(OH)_6$ S=acetate
$Al_7(C_3H_5O_3)_5(C_2H_3O_2)(H_2PO_4)_3(OH)_{12}$
$Al_{5.7}(C_3H_5O_3)_5(C_2H_3O_2)(H_2PO_4)_3(OH)_{8.1}$ S=glycinate
$Al_6(C_3H_5O_3)_6(C_2H_4NO_2)(H_2PO_4)_3(OH)_8$
$Al_7(C_3H_5O_3)_6(C_2H_4NO_2)_2(H_2OH_4)_3(OH)_{10}$ The concentration of the aluminum ions here is in the range of 0.5%-15% by weight (converted, if necessary to $Al^{3+}$) based on the total mass of the solution.

The pH value of the particular solution is preferably in the acid range, more preferably between 1 and 6. In a further preferred embodiment, the solution has a pH value between 2 and 4.

In another embodiment of the invention, the total concentration of the dissolved solids (in water) is in a range of >10% by weight based on the total mass of the solution. Particularly preferred are solutions that have a total concentration of the dissolved solids (in water) in a range >15% by weight based on the total mass of the solution.

It has been shown, however, that high concentrations can lead to a reduced long-term stability of the solution. It is therefore preferred that the total concentration of the dissolved solids (in water) be in a range of <50% by weight based on the total mass of the solution.

Particularly preferred are solutions that have a total concentration of the dissolved solids (in water) in a range of <35% by weight based on the total mass of the solution. Particularly preferred are solutions that have a total concentration of the dissolved solids (in water) in a range of 15%-30% by weight based on the total mass of the solution.

In an embodiment, the molar proportion of phosphate is higher than that of the lactate. The following compounds were identified as examples of stable solutions of this type.

$Al_{6.7}(C_3H_5O_3)_2(C_4H_4O_5)_4(H_2PO_4)_3(OH)_{7.1}$
$Al_{5.8}(C_3H_5O_3)(C_4H_4O_5)_5(H_2PO_4)_3(OH)_{3.4}$

In this case, malate is used as the additional anion. There are also additional preferred examples of stable solutions in which the stochiometric ratio between lactate and phosphate is equal, but, because of the higher molar masses of the phosphate, the mass ratio between lactate and phosphate is shifted in favor of the phosphate. Examples of stable solutions in which the molar ratio between lactate and phosphate is equal are illustrated in the following examples. Malate is also used here as the third anion, which is not necessary, however, and other substances may be used as the third acid as well.

$Al_6(C_3H_5O_3)_3(C_4H_4O_5)_3(H_2PO_4)_3(OH)_6$
$Al_6(C_3H_5O_3)_3(C_4H_4O_5)_3(H_2PO_4)_3(OH)_6$

The availability of a large selection of additional acids for the choice of the third acid is demonstrated via the examples illustrated below in which amino acids were used as the third acid. In addition to the illustrated amino acids glutamic acid and aspartic acid, other (preferably "simple") carboxylic or inorganic acids, such as the amino acids glycine, tyrosine, glutamate, pyroglutamate, aspartate, etc., are also possible as third acids.

$Al_4(C_3H_5O_3)_6(C_5H_8NO_4)_{1.5}(H_2PO_4)_3(OH)_{1.5}$
$Al_4(C_3H_5O_3)_4(C_5H_8NO_4)(H_2PO_4)_4(OH)_3$

With aspartic acid:
$Al_4(C_3H_5O_3)_6(C_4H_6NO_4)_{1.5}(H_2PO_4)_3(OH)_{1.5}$
$Al_4(C_3H_5O_3)_6(C_4H_6NO_4(H_2PO_4)(H_2PO_4)_3(OH)_2$ Examples of the aforementioned stable solutions in which an inorganic acid is used as the third acid (or as the resulting anion) are shown above by way of example ("S=sulfate").

It is also feasible that the (molar) amount of the third ion (or of the third acid) used is equal to or even larger than that of lactate and phosphate. The following table shows compounds as examples of stable solutions. The last example, in particular, shows that a stable solution may even be obtained if the (molar) amount of sulfate exceeds the (molar) total amount of lactate and phosphate:

| |
|---|
| $Al_4(C_3H_5O_3)_3(SO_4)_3(H_2PO_4)(OH)_2$ |
| $Al_5(C_3H_5O_3)_3(SO_4)_3(H_2PO_4)_2(OH)_4$ |
| $Al_5(C_3H_5O_3)_6(SO_4)_3(H_2PO_4)(OH)_2$ |
| $Al_6(C_3H_5O_3)_3(SO_4)_6(H_2PO_4)(OH)_2$ |

All examples listed in the table resulted in clear solutions.

The applicant reserves the right to claim all features disclosed in the application documents as essential to the invention, insofar as they are novel with respect to the prior art, either individually or in combination. Moreover, it is to be noted that features were also described in the individual examples that may be advantageous in their own right. The person skilled in the art immediately recognizes that a specific feature described in an example can also be advantageous even without the adoption of additional features from this example. The person skilled in the art further recognizes that advantages may also result from a combination of a plurality of features demonstrated individually or in different examples.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains.

References cited herein are incorporated by reference herein in their entirety to indicate the state of the art as of their filing date and it is intended that this information can be employed herein, if needed, to exclude specific embodiments that are in the prior art.

The invention claimed is:

1. An aqueous solution comprising aluminum ions, wherein the solution comprises aluminum ions in a proportion of 1.5% -15% by weight (converted to $Al^{3+}$) based on the total mass of the solution, as well as anions of lactic acid (lactate ions) and of phosphoric acid (phosphate ions), wherein the molar proportion of the lactate ions is in the range of 0.01-2.99 times the molar proportion of $Al^{3+}$, and the molar proportion of phosphate ions is in the range of 0.01-2.99 times the molar proportion of $Al^{3+}$.

2. The aqueous solution according to claim 1, wherein the solution further comprises an anion of at least a third acid.

3. The aqueous solution according to claim 2, wherein the third acid is selected from a group consisting of an amino acid, carboxylic acid, citric acid, tartaric acid, malic acid, oxalic acid, glycolic acid, succinic acid, gluconic acid, glycine, acetic acid, sulfuric acid, and combinations thereof.

4. The aqueous solution according to claim 1, wherein the solution comprises at least one additional cation, wherein the cation is selected from a group consisting of alkali metal ions, alkali earth ions, ammonium ions, cations of one or a plurality of transition or rare earth metals, and combinations thereof.

5. The aqueous solution according to claim 4, wherein the cation is selected from a group consisting of $Na^+$, $K^+$, $Ca^{2+}$, $Mg^{2+}$, $Zr^{2+}$, $NH_4^+$, and combinations thereof.

6. The aqueous solution according to claim 1, wherein the solution comprises clusters which include the compound

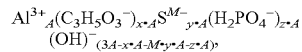

wherein S is an anion of an optionally present third acid with the charge M,
x is a value in the range of 0.01-2.99,
y is a value in the range of 0-2.8, and
z is a value in the range of 0.05-2.9.

7. The aqueous solution according to claim 6, wherein (3A-x•A-M•y•A-z•A) is >0.

8. The aqueous solution according to claim 6, wherein x is a value in the range of 1.0-1.5.

9. The aqueous solution according to claim 6, wherein y is a value in the range of 0-1.0.

10. The aqueous solution according to claim 6, wherein z is a value in the range of 0.3-1.25.

11. The aqueous solution according to claim 1, wherein the solution is stable in a temperature range of 0° C.-80° C.

12. The aqueous solution according to claim 11, wherein the solution is stable in storage at a temperature of <30° C. for a period >one month.

13. The aqueous solution according to claim 11, wherein the solution is stable in storage at a temperature of <10° C. for a period >12 months.

14. A method for creating an aqueous solution, wherein the solution comprises aluminum ions in a proportion of 1.5%-15% by weight (converted to $Al^{3+}$) based on the total mass of the solution, as well as anions of lactic acid (lactate ions) and of phosphoric acid (phosphate ions), wherein the molar proportion of the lactate ions is in the range of 0.01-2.99 times the molar proportion of $Al^{3+}$ and the molar proportion of phosphate ions is in the range of 0.01-2.99 times the molar proportion of $Al^{3+}$, said method comprising the following steps:
a) providing water in a reaction vessel;
b) adding a basic aluminum salt into the reaction vessel while stirring;
c) adding a lactic acid and/or a lactate and, in parallel or offset in time, adding a phosphoric acid and/or a phosphate;
d) stirring the resulting mixture, wherein the sequence for performing the steps b) and c) is discretionary.

15. The method according to claim 14, wherein clusters of the compound $Al^{3+}{}_A(C_3H_5O_3^-)_{x\bullet A}S^{M-}{}_{y\bullet A}(H_2PO_4^-)_{z\bullet A}(OH)^-{}_{(3A-x\bullet A-M\bullet y\bullet A-z\bullet A)}$ are created,
wherein S is an anion of an optionally present third acid with the charge M,
x is a value in the range of 0.01-2.99,
y is a value in the range of 0-2.8, and
z is a value in the range of 0.05-2.9.

16. The method according to claim 14, wherein step c) is performed at a temperature >25° C.

17. The method of claim 16 wherein step c) is performed at a temperature at 60-70° C.

18. The method of claim 16 wherein step c) is performed under reflux.

19. The method according to claim 14, further comprising a filtration step after step c).

20. The method of claim 14, wherein the basic aluminum salt is selected from a group consisting of Al carbonate, Al hydroxide, Al oxide, an aluminate, and combinations thereof.

* * * * *